(12) United States Patent
Zhang et al.

(10) Patent No.: US 11,235,289 B2
(45) Date of Patent: Feb. 1, 2022

(54) NANOCOMPOSITE MEMBRANE FOR HEAVY METAL REJECTION AND PREPARATION METHOD THEREOF

(71) Applicant: Nanjing University, Nanjing (CN)

(72) Inventors: Weiming Zhang, Nanjing (CN); Wenbin Zhang, Nanjing (CN); Mengqi Shi, Nanjing (CN); Siyu Lei, Nanjing (CN); Bingcai Pan, Nanjing (CN); Lu Lv, Nanjing (CN)

(73) Assignee: NANJING UNIVERSITY, Nanjing (CN)

(*) Notice: Subject to any disclaimer, the term of this patent is extended or adjusted under 35 U.S.C. 154(b) by 0 days.

(21) Appl. No.: 16/727,830

(22) Filed: Dec. 26, 2019

(65) Prior Publication Data

US 2020/0330930 A1 Oct. 22, 2020

(30) Foreign Application Priority Data

Apr. 17, 2019 (CN) .......................... 201910308753.1

(51) Int. Cl.
*B01D 67/00* (2006.01)
*B01D 61/02* (2006.01)
(Continued)

(52) U.S. Cl.
CPC ....... *B01D 67/0079* (2013.01); *B01D 61/027* (2013.01); *B01D 69/12* (2013.01);
(Continued)

(58) Field of Classification Search
CPC .. B01D 69/125; B01D 61/027; B01D 69/147; B01D 71/022; B01D 69/12; B01D 71/34;
(Continued)

(56) References Cited

U.S. PATENT DOCUMENTS

| | | | |
|---|---|---|---|
| 2011/0027599 A1* | 2/2011 | Hoek | B01D 71/56 428/476.3 |
| 2013/0270188 A1* | 10/2013 | Karnik | G01N 15/082 210/650 |

FOREIGN PATENT DOCUMENTS

| | | |
|---|---|---|
| CN | 204380534 U | 6/2015 |
| CN | 107486029 A | 12/2017 |
| CN | 107583607 A | 1/2018 |

* cited by examiner

*Primary Examiner* — Vishal V Vasisth

(57) ABSTRACT

The present invention discloses a nanocomposite membrane for heavy metal rejection and a preparation method thereof. The nanocomposite membrane comprises a porous membrane prepared from a two-dimensional sheet material and a hydrophilic inorganic nanomaterial distributed between the sheets of the two-dimensional material. The effective pore size of the nanocomposite membrane under wet conditions is not greater than 1.2 nm. The static water contact angle of the nanocomposite membrane is not greater than 45°. The preparation method of the nanocomposite membrane comprises: adding reactants on both sides of a nanoporous membrane to carry out an interfacial synthesis reaction to obtain the nanocomposite membrane. The method is simple and controllable. Driven by lower pressure, heavy metal ions in water are rejected by a pore size screening function, thereby achieving the purpose of deep removal. The nanocomposite membrane can be used to quickly remove heavy metal ions from water.

14 Claims, 7 Drawing Sheets

(51) Int. Cl.
  *B01D 69/12* (2006.01)
  *B01D 71/02* (2006.01)
  *B01D 71/34* (2006.01)
  *C02F 1/44* (2006.01)
  *C02F 101/22* (2006.01)
(52) U.S. Cl.
  CPC ........... *B01D 71/022* (2013.01); *B01D 71/34* (2013.01); *C02F 1/442* (2013.01); *C02F 2101/22* (2013.01)
(58) Field of Classification Search
  CPC .............. B01D 69/148; B01D 67/0079; B01D 2325/36; C02F 1/442; C02F 2101/20; C02F 2101/22
  See application file for complete search history.

NANOCOMPOSITE MEMBRANE FOR HEAVY METAL REJECTION AND PREPARATION METHOD THEREOF

CROSS-REFERENCE TO RELATED APPLICATIONS

This application claims priority to Chinese Patent Application No. 201910308753.1, filed on Apr. 17, 2019 in the Chinese Intellectual Property Office, the disclosures of which is incorporated herein by reference.

BACKGROUND

Technical Field

The present invention relates to the field of water treatment, and in particular relates to a nanocomposite membrane for heavy metal rejection and a preparation method thereof.

Related Art

Heavy metal ions are one of the main pollutants in water, and seriously threaten the ecological environment and people's lives due to their strong toxicity and non-biodegradability. At present, methods for deep removal of heavy metal ions include chemical precipitation, electrodeposition, adsorption, membrane separation, and the like.

An application with the Chinese patent application No. 201710925763.0, disclosed on Jan. 16, 2018, invented a graphene oxide aerogel, and a layer of polymer is deposited by evaporation on the surface of the graphene oxide aerogel to improve the mechanical strength. The composite material has good heavy metal ion adsorption performance, has a $Cd^{2+}$ adsorption capacity reaching 500 mg/g, and has a $Pb^{2+}$ adsorption capacity up to 1020 mg/g.

Compared with the adsorption method, the membrane separation technology (nanofiltration and reverse osmosis) is widely studied for use in deep removal of heavy metal ions due to high separation efficiency, simple operation, no secondary pollution, and the like.

For example, an application with the Chinese patent application No. 201420538006.X, disclosed on Jun. 10, 2015, used P84, polyethyleneimine, polyamide-imine and other porous substrates to crosslink with PEI (Polyetherimide) and the like to obtain a hollow fiber membrane as a nanofiltration membrane. The nanofiltration membrane includes a porous support layer and a selective layer on one surface of the porous support layer, wherein the average effective pore radius of the membrane is less than or equal to 0.3 nm. The nanofiltration membrane can remove heavy metals such as Mg (for example, $MgCl_2$) and Pb (for example, $Pb(NO_3)_2$) from waste water, thereby recycling valuable products and recycling waste water containing the heavy metals. The nanofiltration membrane has a rejection rate of $Pb(NO_3)_2$ up to 91%. Although the nanofiltration membrane achieves an excellent metal rejection effect, the operating pressure is high and the energy consumption is high. For example, the operating pressure of the polyimide nanofiltration membrane is as high as 13 bar. Meanwhile, the pure water flux is less than 1 $L/m^2$ hbar, and the separation efficiency is low. Therefore, it is urgent to develop a nanofiltration membrane which can effectively separate heavy metal ions at a lower pressure.

By searching, porous membranes which can carry out separation filtration under low operating pressures were disclosed in the prior art. For example, a preparation method of an extremely low-pressure reverse osmosis membrane was disclosed in an application with the Chinese patent application No. 201710877128.X, disclosed on Dec. 19, 2017. The extremely low-pressure reverse osmosis membrane is a polyamide reverse osmosis composite membrane having a high water yield and a high salt rejection rate at a low operating pressure, which is obtained by an interfacial reaction between an aqueous solution of an aromatic polyamine and an aromatic polyacyl chloride solution on a porous support membrane. An additive is added to an organic phase solution used for interfacial polymerization, and the additive at least includes one or more of N,N-dimethyl-2-imidazolidinone (DMI), N,N-dimethylpropenyl urea (DMPU), tributyl phosphate (TBP), and triethyl phosphate (TEP). The polyamide reverse osmosis composite membrane prepared by the application has the characteristics of a high water yield and a high rejection rate under a low operating pressure (3-4 bar). However, the reaction is to synthesize an organic membrane by using an organic reagent through interfacial reaction, and the organic reagent used will bring the risk of environmental pollution. The formed polyamide reverse osmosis composite membrane is generally only used to remove Ca and Mg divalent ions, and the application range is not wide enough.

The interfacial reaction used in the above application is various chemical reactions occurring under certain conditions based on the characteristics of the contact surface between two phases and the kind, content, existing state and property of various chemical substances on the surface. In the field of separation membranes, an organic reagent capable of forming a membrane is mainly used for carrying out an interfacial reaction to form a nanofiltration or reverse osmosis membrane, thereby making the prepared separation membrane have superior performance.

SUMMARY

1. Problems to be Solved

In view of the problems that an existing composite membrane has high operating pressure and high energy consumption when separating and removing heavy metal ions, the present invention provides a nanofiltration membrane capable of effectively separating heavy metal ions at a low pressure (1 bar). In the present invention, a hydrophilic inorganic nanomaterial is synthesized at the interface by adding reactant A and reactant B on both sides of the nanoporous membrane, respectively.

2. Technical Solutions

In order to solve the above problems, the technical solutions adopted by the present invention are as follows.

The present invention provides a nanocomposite membrane for heavy metal rejection. The nanocomposite membrane includes a nanoporous membrane and a hydrophilic inorganic nanomaterial distributed in the interior and on the surface of the nanoporous membrane. The pore size of the nanocomposite membrane under wet conditions is not greater than 1.2 nm.

It is difficult to achieve the pore size of no more than 1.2 nm according to the level of the prior art. The method of the present invention significantly reduces the pore size of the membrane under wet conditions.

The wet condition in the present invention means that a membrane is sufficiently soaked in water or an aqueous solution, and the soakage time is usually more than 6 h. The corresponding dry condition means that a membrane is dried for more than 72 h under certain temperature conditions (usually room temperature, for example, 25° C.).

As a further improvement of the present invention, the static water contact angle of the nanocomposite membrane is not greater than 45°.

As a further improvement of the present invention, the average effective pore size of the nanocomposite membrane under wet conditions is less than 1.2 nm.

As a further improvement of the present invention, the average effective pore size of the nanocomposite membrane under wet conditions is 0.6-1.2 nm.

As a further improvement of the present invention, the hydrophilic inorganic nanomaterial is synthesized from reactants through an interfacial reaction by using a nanoporous membrane as an interface.

As a further improvement of the present invention, the nanoporous membrane is prepared from a two-dimensional nanosheet material and a polymer base membrane.

As a further improvement of the present invention, the two-dimensional sheet material includes any one or a combination of two or more of molybdenum sulfides, molybdenum selenides, tungsten sulfides, tungsten selenides, platinum selenides, rhenium selenides, tin sulfides, graphenes, graphene derivatives, $C_3N_4$, $Ti_4N_3$, and layered double hydroxides.

The polymer base membrane includes a hydrophilic Polyvinylidene Fluoride (PVDF) membrane.

As a further improvement of the present invention, the inorganic nanomaterial includes any one or a combination of two or more of silicates, phosphates, metal sulfides, metal oxides and metal hydroxides.

As a further improvement of the present invention, a preparation method of the nanocomposite membrane comprises the following steps:

(1) dispersing a two-dimensional sheet material in water to prepare a two-dimensional sheet material dispersion, and then, pouring the dispersion into a suction flask in which a polymer base membrane is placed in advance, to carry out suction filtration and washing to obtain a nanoporous membrane; and (2) fixing the nanoporous membrane in a reaction tank, adding reactant A and reactant B on both sides of the nanoporous membrane so that the reactant A and the reactant B interfacially synthesize a hydrophilic inorganic nanomaterial, and washing to obtain a nanocomposite membrane.

As a further improvement of the present invention, in the step (1), the two-dimensional nanosheet dispersion is prepared by ultrasonic dispersion, ultrasonic time is 0.02-10 h, and the concentration of the two-dimensional nanosheet dispersion is 0.0001-200 mg/L.

As a further improvement of the present invention, the suction filtration in the step (1) is carried out at a pressure of 0.01-1 bar for 0.01-15 h.

As a further improvement of the present invention, the time of the interfacial synthesis reaction in the step (2) is 0.1-24 h.

As a further improvement of the present invention, the nanocomposite membrane is used for the rejection of heavy metal ions in water.

3. Beneficial Effects

Compared with the prior art, the present invention has the following beneficial effects.

(1) In the nanocomposite membrane for heavy metal rejection of the present invention, the nanoporous membrane is prepared by using the two-dimensional sheet material, and reactants (inorganic material) are respectively added on both sides of the nanoporous membrane by using the nanoporous membrane as an interface, so that the hydrophilic inorganic nanomaterial is formed on the surface and in the interior of the nanoporous membrane. The formed hydrophilic inorganic nanomaterial significantly reduces the water contact angle of the nanoporous membrane and improves the hydrophilicity. According to the Yang-Laplace equation, as the hydrophilicity increases, the Laplace additional pressure of nanopores increases. Therefore, the nanocomposite membrane of the present invention has a larger water flux at a low pressure, and the reaction energy consumption is significantly reduced.

(2) In the nanocomposite membrane for heavy metal rejection of the present invention, an inorganic substance is added on the left and right sides of the nanoporous membrane to perform an interfacial reaction, so that the inorganic hydrophilic material can be formed inside the nanoporous membrane having small voids. Not only the hydrophilicity of the nanoporous membrane is significantly improved, but also the effective pore size under wet conditions is significantly reduced. The wet condition in this discussion means that a membrane is sufficiently soaked in water or an aqueous solution, and the soakage time is usually more than 6 h. The corresponding dry condition means that a membrane is dried for more than 72 h under certain temperature conditions (usually room temperature, for example, 25° C.). Efficient rejection of heavy metal ions is realized by reducing the effective pore size under wet conditions. The nanocomposite membrane of the present invention has excellent rejection effects on various heavy metal ions (>90%).

(3) The nanocomposite membrane for heavy metal rejection of the present invention has good chemical stability, good mechanical properties and wide range of application. The preparation method of the nanocomposite membrane of the present invention is simple, uses inorganic materials which are environmentally friendly, and is favorable for popularization.

DETAILED DESCRIPTION

The present invention is further described below with reference to specific embodiments.

Example 1

The nanocomposite membrane in this example was prepared by the steps as follows.

1) Preparation of a two-dimensional sheet material dispersion: Commercially available single-layer molybdenum diselenide was purchased and prepared by chemical vapor deposition into a two-dimensional sheet material with a diameter of 20-50 μm and a thickness of 0.6-0.8 nm. The two-dimensional sheet material was dispersed in deionized water and ultrasonicated for 5 h to prepare the dispersion having a concentration of 0.02 g/L.

2) Preparation of a molybdenum diselenide porous membrane: A hydrophilic PVDF membrane (pore size: 0.22 μm) was fixed in a suction flask, and the effective area of the hydrophilic PVDF membrane was 2.01 cm². 10 mL of the dispersion prepared in step 1) was taken and poured into a glass tube over the membrane of the suction flask. A vacuum circulating water pump was used for suction filtration for 0.01 h at a pressure of 1 bar. After water in the dispersion was completely extracted from the bottom of the membrane, the obtained membrane (together with the PVDF membrane) was taken out, and soaked and washed in deionized water. After 24 h, the molybdenum diselenide porous membrane was obtained.

3) Interfacial reaction synthesis of the nanocomposite membrane: The molybdenum diselenide porous membrane was fixed in a reaction tank. 20 mL of a potassium phosphate solution having a concentration of 0.01 mol/L and 15 mL of a calcium chloride solution having a concentration of 0.01 mol/L were successively added. A reaction was carried out at 35±1° C. for 10 h. The porous membrane was taken out and placed in deionized water for soaking and washing, and the nanocomposite membrane was prepared and stored in deionized water.

Figure 1:
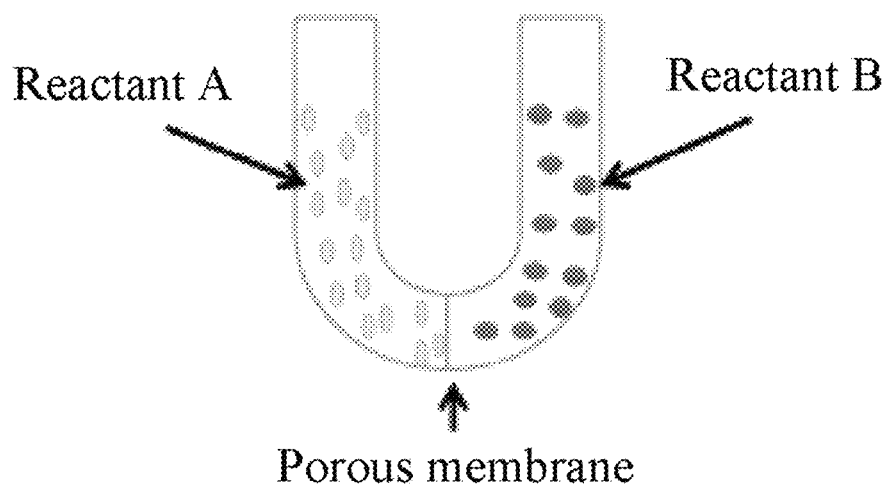
FIG. 1 is a schematic view showing the preparation of a nanocomposite membrane of the present invention.

As shown in FIG. 1, during the interfacial synthesis reaction, the molybdenum diselenide porous membrane was positioned in the middle of the reaction tank, reactant 1 was the potassium phosphate solution, and reactant 2 was the calcium chloride solution.

Figure 2:
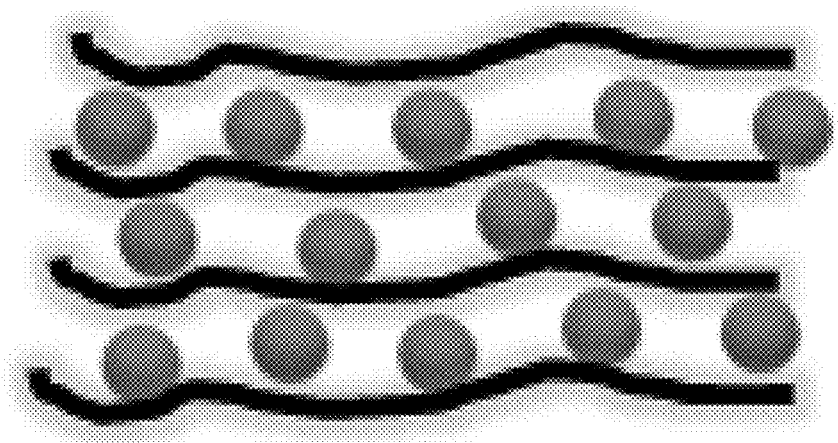
FIG. 2 is a schematic cross-sectional (sectional) view of the nanocomposite membrane prepared in Example 1 of the present invention.
Figure 3:
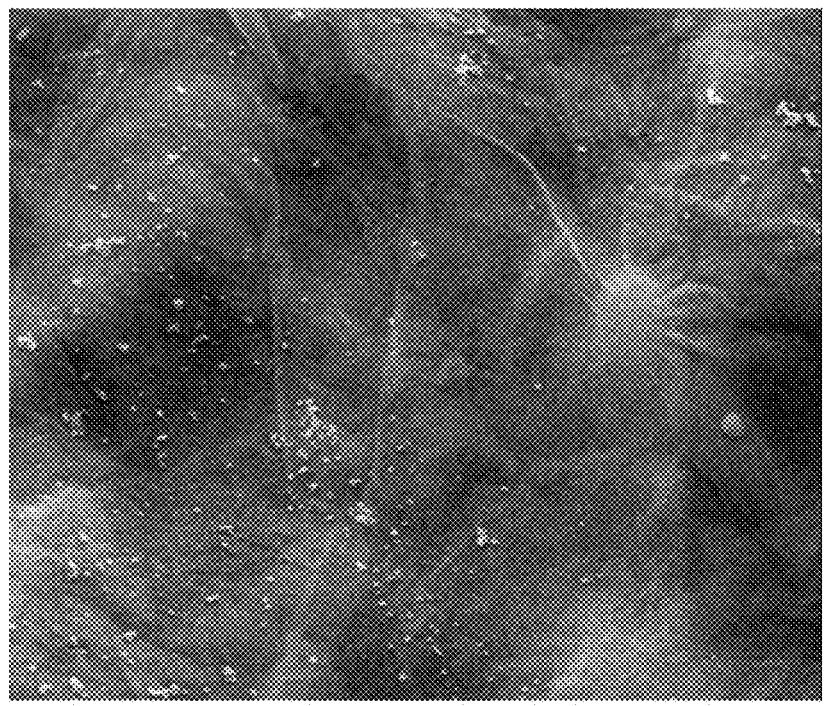
FIG. 3 is a scanning electron micrograph of the surface of the nanocomposite membrane prepared in Example 1 of the present invention.
Figure 4:
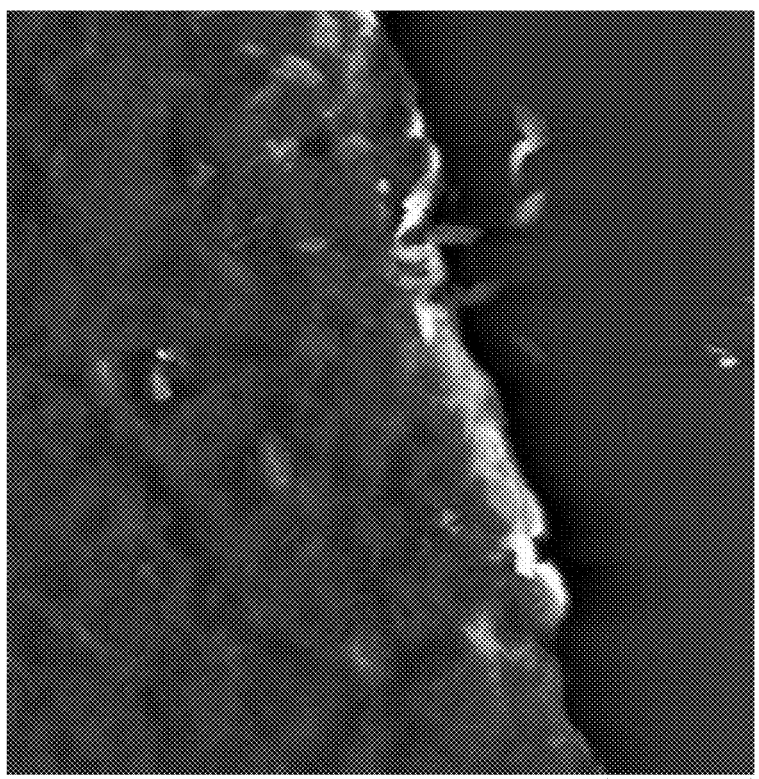
FIG. 4 is an atomic force micrograph of the nanocomposite membrane prepared in Example 1 of the present invention.
Figure 5:
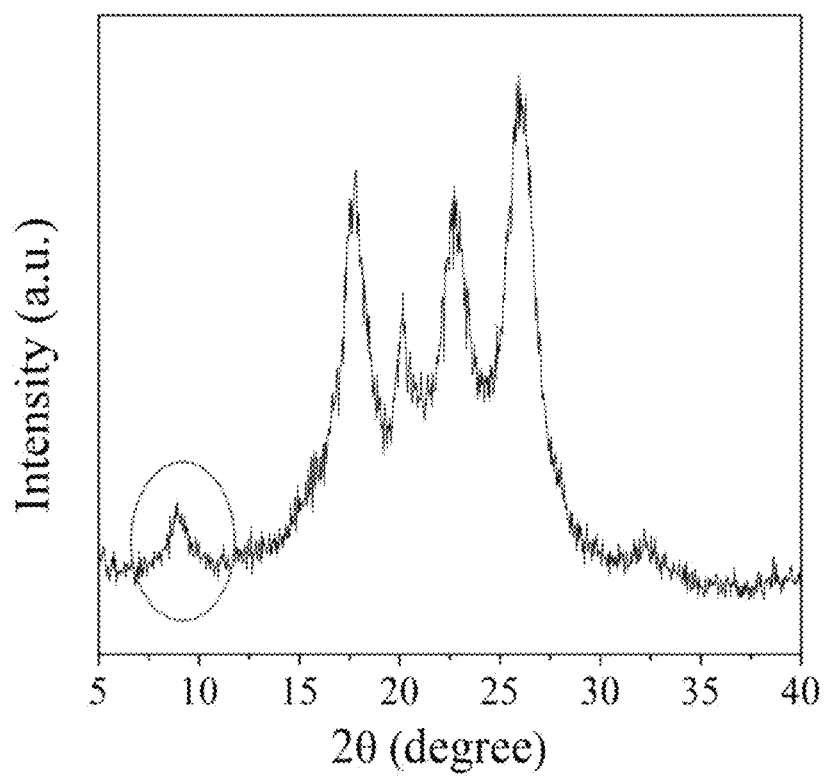
FIG. 5 is an X-ray diffraction pattern of the nanocomposite membrane prepared in Example 1 of the present invention.

A schematic cross-sectional (sectional) diagram of the nanocomposite membrane of the present invention is shown in FIG. 2. According to FIG. 2, the hydrophilic calcium phosphate generated by the interfacial reaction is stably dispersed between the molybdenum diselenide sheets. The scanning electron micrograph of the surface of the composite membrane is shown in FIG. 3. According to FIG. 3, the surface of the nanocomposite membrane is smooth, and no obvious defects are found. The atomic force micrograph of the composite membrane is shown in FIG. 4. According to FIG. 4, the thickness of the nanocomposite membrane is 180±15 nm. The X-ray diffraction pattern (FIG. 5) of the composite membrane has a diffraction peak at 8.87°. According to the Bragg equation, the nanocomposite membrane has an interlayer spacing of 0.99 nm.

The contact angle of the porous membrane of this example was measured. The water contact angle was measured to be 22.4±3.2°, and the pore size was 0.65 nm (under wet conditions). The manner in which the pore size was measured under wet conditions employs an universal ion calibration method for nanomembranes in the prior art.

According to the Yang-Laplace equation, as the hydrophilicity increases, the Laplace additional pressure of nanopores increases. Therefore, the nanocomposite membrane has a larger water flux at a low pressure.

Figure 7:
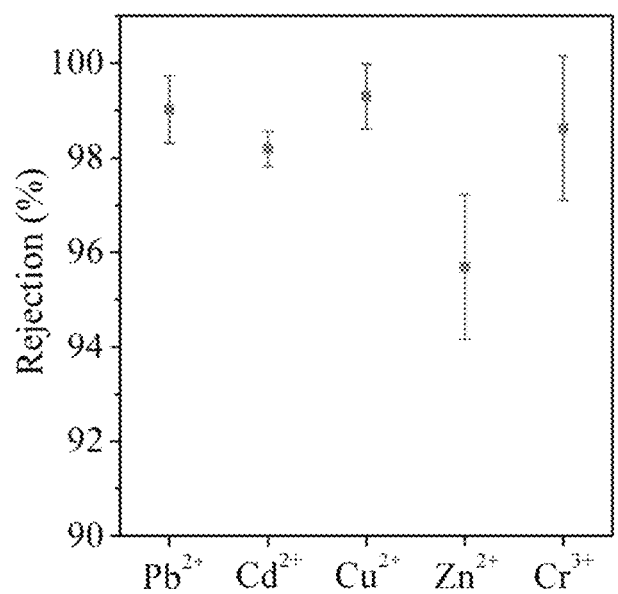
FIG. 7 is a graph showing the rejection data of five kinds of heavy metal ions by the nanocomposite membrane prepared in Example 1 of the present invention.

Filtration and rejection of heavy metals using the nanocomposite membrane:

The nanocomposite membrane prepared above was fixed in an ultrafiltration cup, and different concentrations of heavy metal ions aqueous solutions were added to carry out a filtration and rejection test at an operating pressure of 1 bar.

$$L = \frac{V}{A \cdot t \cdot \Delta p} \quad (1)$$

$$\text{Rejection \%} = \frac{c_0 - c_t}{c_0} \times 100\% \quad (2),$$

where L is the water flux, V is the filtration volume, A is the effective area of the membrane, t is the filtration time, $\Delta p$ is the operating pressure, Rejection % is the rejection rate of heavy metal ions of the nanocomposite membrane, and $C_0$ and $C_t$ are the concentrations of heavy metal ions in water before and after filtration respectively. The rejection test of heavy metal ions by the composite membrane prepared in Embodiment 1 at an operating pressure of 1 bar is shown in Table 1. FIG. 7 is a graph showing the rejection data of five kinds of heavy metal ions by the nanocomposite membrane prepared in Example 1 of the present invention.

TABLE 1

Rejection test of heavy metal ions by composite membrane prepared in Example 1 (operating pressure: 1 bar)

| Heavy metal | L (L/m²h) | $C_0$ (mg/L) | $C_t$ (mg/L) | Rejection rate (%) |
|---|---|---|---|---|
| $Pb^{2+}$ | 35 | 2 | 0.02 | 99.0 |
| $Cd^{2+}$ | 37 | 2 | 0.04 | 98.1 |
| $Cu^{2+}$ | 50 | 2 | 0.01 | 99.2 |
| $Zn^{2+}$ | 21 | 2 | 0.08 | 95.6 |
| $Cr^{3+}$ | 31 | 2 | 0.03 | 98.6 |

Example 2

The nanocomposite membrane in this example was prepared by the steps as follows.

Commercially available single-layer tungsten disulfide was purchased and prepared by chemical vapor deposition into a two-dimensional sheet material with a diameter of 20-30 μm and a thickness of 0.6-0.8 nm. The two-dimensional sheet material was dispersed in deionized water and ultrasonicated for 10 h to prepare the dispersion having a concentration of 200 mg/L.

A hydrophilic PVDF membrane (pore size: 0.22 μm) was fixed in a suction flask, and the effective area of the hydrophilic PVDF membrane was 2.01 cm². 10 mL of the above dispersion was taken and poured into a glass tube over the membrane of the suction flask. A vacuum circulating water pump was used for suction filtration for 2 h at a pressure of 0.05 bar. After water in the dispersion was completely extracted from the bottom of the membrane, the membrane (together with the PVDF membrane) was taken out, and soaked and washed in deionized water. After 24 h, the tungsten disulfide porous membrane was obtained.

The tungsten disulfide porous membrane was fixed in a reaction tank. 20 mL of a 0.02 mol/L zirconium oxychloride solution and 20 mL of a 0.02 mol/L potassium carbonate solution were successively added. A reaction was carried out at 35±1° C. for 24 h. Zirconium hydroxide nanoparticles were formed inside the porous membrane by an interfacial reaction and stably dispersed between the sheets of the two-dimensional material. After the reaction, the porous membrane was taken out and placed in deionized water for soaking and washing, and the nanocomposite membrane was prepared and stored in deionized water.

The contact angle of the porous membrane of this example was measured to be 8.2±2°, and the pore size was 0.60 nm (under wet conditions).

Example 3

The nanocomposite membrane in this example was prepared by the steps as follows.

Graphene oxide was prepared by the Hummers method, and the preparation method refers to a patent with the patent application No. 201810242893.6. The graphene oxide has a diameter of 0.2-10 μm and a thickness of 1.2-1.8 nm. The graphene oxide was dispersed in deionized water and ultrasonicated for 5 h to prepare the dispersion having a concentration of 10 mg/L.

A hydrophilic PVDF membrane (pore size: 0.22 μm) was fixed in a suction flask, and the effective area of the hydrophilic PVDF membrane was 2.01 cm$^2$. 50 ml of the above dispersion was taken and poured into a glass tube over the membrane of the suction flask. A vacuum circulating water pump was used for suction filtration for 15 h at a pressure of 0.01 bar. After water in the dispersion was completely extracted from the bottom of the membrane, the membrane (together with the PVDF membrane) was taken out, and soaked and washed in deionized water. After 24 h, the graphene oxide porous membrane was obtained.

The graphene oxide porous membrane was fixed in a reaction tank. 20 mL of a 0.02 mol/L potassium sulfide solution and 20 mL of a 0.02 mol/L lanthanum nitrate solution were successively added. A reaction was carried out at room temperature (22±1° C.) for 10 h. Lanthanum sulfide nanoparticles were formed inside the porous membrane by an interfacial reaction and stably dispersed between the sheets of the two-dimensional material. After the reaction, the porous membrane was taken out and placed in deionized water for soaking and washing, and the nanocomposite membrane was prepared and stored in deionized water.

The contact angle of the porous membrane of this example was measured to be 39±2.6°, and the pore size was 0.82 nm (under wet conditions).

Example 4

The nanocomposite membrane in this example is prepared by the steps as follows.

Preparation of Co—Al-LDHs: $CoCl_3.6H_2O$ and $AlCl_3.6H_2O$ were mixed in a molar ratio of 1:2 to prepare a salt solution. With stirring, a 0.5 M aqueous ammonia solution was added until a precipitate was formed completely. Filtration was carried out using a Buchner funnel to obtain the precipitate. The precipitate was thermally insulated at 90±1° C. for 24 h and then dried to obtain the Co—Al-LDHs. Observed by scanning electron microscopy, the particle size of the Co—Al-LDHs was 200-300 nm. The Co—Al-LDHs was dispersed in deionized water and ultrasonicated for 0.02 h to obtain the dispersion having a concentration of 0.0001 mg/L.

A hydrophilic PVDF membrane (pore size: 0.1 μm) was fixed in a suction flask, and the effective area of the hydrophilic PVDF membrane was 2.01 cm$^2$. 20 ml of the above dispersion was taken and poured into a glass tube over the membrane of the suction flask. A vacuum circulating water pump was used for suction filtration for 2 h at a pressure of 0.05 bar. After water in the dispersion was completely extracted from the bottom of the membrane, the membrane (together with the PVDF membrane) was taken out, and soaked and washed in deionized water. After 24 h, the Co—Al-LDHs porous membrane was obtained.

The Co—Al-LDHs porous membrane was fixed in a reaction tank. 20 mL of a 0.02 mol/L sodium silicate solution and 25 mL of a 0.02 mol/L cerium chloride solution were successively added. A reaction was carried out at 42±1° C. for 0.1 h. Cerium silicate nanoparticles were formed inside the porous membrane by an interfacial reaction and stably dispersed between the sheets of the two-dimensional material. After the reaction, the porous membrane was taken out and placed in deionized water for soaking and washing, and the nanocomposite membrane was prepared and stored in deionized water.

The contact angle of the porous membrane of this example was measured to be 20.6±1.6°, and the pore size was 0.69 nm (under wet conditions).

Example 5

The nanocomposite membrane in this example is prepared by the steps as follows.

Preparation of $C_3N_4$: 5 g of urea was placed in a crucible, and reacted at 550° C. for 10 h in a tube furnace to obtain a $C_3N_4$ sheet material. Observed by scanning electron microscopy, the particle size of the $C_3N_4$ sheet material was 100-500 nm. The $C_3N_4$ sheet material was dispersed in deionized water and ultrasonicated for 2 h to obtain the dispersion having a concentration of 0.05 g/L.

A hydrophilic PVDF membrane (pore size: 0.1 μm) was fixed in a suction flask, and the effective area of the hydrophilic PVDF membrane was 2.01 cm$^2$. 20 ml of the above dispersion was taken and poured into a glass tube over the membrane of the suction flask. A vacuum circulating water pump was used for suction filtration for 2 h at a pressure of 0.05 bar. After water in the dispersion was completely extracted from the bottom of the membrane, the membrane (together with the PVDF membrane) was taken out, and soaked and washed in deionized water. After 24 h, the $C_3N_4$ porous membrane was obtained.

The $C_3N_4$ porous membrane was fixed in a reaction tank. 10 mL of a 0.02 mol/L metatitanic acid solution and 55 mL of a 0.02 mol/L hydrochloric acid solution were successively added. A reaction was carried out at 60±1° C. for 2 h. Titanium dioxide nanoparticles were formed inside the porous membrane by an interfacial reaction and stably dispersed between the sheets of the two-dimensional material. After the reaction, the porous membrane was taken out and placed in deionized water for soaking and washing, and the nanocomposite membrane was prepared and stored in deionized water.

The contact angle of the porous membrane of this example was measured to be 15.0±0.9°, and the pore size was 1.1 nm (under wet conditions).

Comparative Example 1

The nanoporous membrane in this comparative example is prepared by the steps as follows.

Commercially available single-layer molybdenum diselenide was purchased and prepared by chemical vapor deposition into a two-dimensional sheet material with a diameter of 20-50 μm and a thickness of 0.6-0.8 nm. The two-dimensional sheet material was dispersed in deionized water and ultrasonicated for 5 h to prepare the dispersion having a concentration of 0.02 g/L.

A hydrophilic PVDF membrane (pore size: 0.22 μm) was fixed in a suction flask, and the effective area of the hydrophilic PVDF membrane was 2.01 cm². 10 ml of the above dispersion was taken and poured into a glass tube over the membrane of the suction flask. A vacuum circulating water pump was used for suction filtration for 0.01 h at a pressure of 1 bar. After water in the dispersion was completely extracted from the bottom of the membrane, the membrane (together with the PVDF membrane) was taken out, and soaked and washed in deionized water. After 24 h, the molybdenum diselenide porous membrane was obtained.

Figure 6:
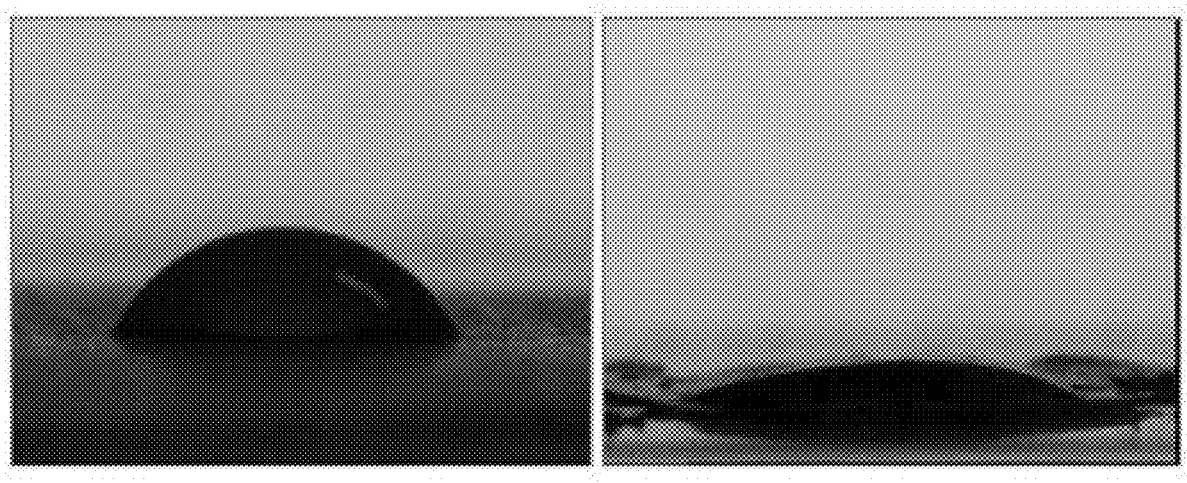
FIG. 6 is a comparison diagram of water contact angles of the nanocomposite membranes prepared in Example 1 and Comparative Example 1 of the present invention.

The contact angle of the porous membrane of this comparative example was measured to be 65.6±3.1°, and the pore size was 1.67 nm (under wet conditions). FIG. 6 is a comparison diagram of water contact angles of the nanocomposite membranes prepared in Example 1 and Comparative Example 1 of the present invention. The rejection test of heavy metal ions by the porous membrane prepared in Comparative Example 1 is shown in Table 2.

TABLE 2

Rejection test of heavy metal ions by porous membrane prepared in Comparative Example 1 (operating pressure: 1 bar)

| Heavy metals | L (L/m²h) | $C_0$ (mg/L) | $C_t$ (mg/L) | Rejection rate (%) |
|---|---|---|---|---|
| $Pb^{2+}$ | 3 | 2 | 0.94 | 53.0 |
| $Cd^{2+}$ | 3 | 2 | 1.16 | 42.1 |
| $Cu^{2+}$ | 5 | 2 | 1.26 | 37.6 |
| $Zn^{2+}$ | 2 | 2 | 1.44 | 28.4 |
| $Cr^{3+}$ | 3 | 2 | 1.28 | 36.1 |

According to Table 1 and Table 2, the nanocomposite membrane prepared by the present invention has a higher water flux, reaching 21-50 L/m² h, and has a rejection rate of heavy metals reaching 96%-99%. The nanoporous membrane in the prior art has a water flux of only 2-5 L/m² h, and a rejection rate of heavy metals reaching only 28%-53%.

Comparative Example 2

The nanoporous membrane in this comparative example is prepared by the steps as follows.

Graphene oxide was prepared by the Hummers method with reference to a preparation method in a patent with the application No. 201810242893.6. The prepared graphene oxide has a diameter of 0.2-10 μm and a thickness of 1.2-1.8 nm. The graphene oxide was dispersed in deionized water and ultrasonicated for 5 h to prepare the dispersion having a concentration of 10 mg/L.

A hydrophilic PVDF membrane (pore size: 0.22 μm) was fixed in a suction filter flask, and the effective area of the hydrophilic PVDF membrane was 2.01 cm². 50 ml of the above dispersion was taken and poured into a glass tube over the membrane of the suction flask. A vacuum circulating water pump was used for suction filtration for 15 h at a pressure of 0.01 bar. After water in the dispersion was completely extracted from the bottom of the membrane, the membrane (together with the PVDF membrane) was taken out, and soaked and washed in deionized water. After 24 h, the graphene oxide porous membrane was obtained.

The contact angle of the porous membrane of this comparative example was measured to be 60.3±2.0°, and the pore size was 1.34 nm (under wet conditions).

Comparative Example 3

The nanoporous membrane in this comparative example is prepared by the steps as follows.

Preparation of Co—Al-LDHs: $CoCl_3 \cdot 6H_2O$ and $AlCl_3 \cdot 6H_2O$ were mixed in a molar ratio of 1:2 to prepare a salt solution. With stirring, a 0.5 M aqueous ammonia solution was added until a precipitate was formed completely. Filtration was carried out using a Buchner funnel to obtain the precipitate. The precipitate was thermally insulated at 90±1° C. for 24 h and then dried to obtain the Co—Al-LDHs. Observed by scanning electron microscopy, the particle size of the Co—Al-LDHs was 200-300 nm. The Co—Al-LDHs was dispersed in deionized water and ultrasonicated for 0.02 h to obtain the dispersion having a concentration of 0.0001 mg/L.

A hydrophilic PVDF membrane (pore size: 0.1 μm) was fixed in a suction flask, and the effective area of the hydrophilic PVDF membrane was 2.01 cm². 10 mL of the above dispersion was taken and poured into a glass tube over the membrane of the suction flask. A vacuum circulating water pump was used for suction filtration for 2 h at a pressure of 0.05 bar. After water in the dispersion was completely extracted from the bottom of the membrane, the membrane (together with the PVDF membrane) was taken out, and soaked and washed in deionized water. After 24 h, the Co—Al-LDHs porous membrane was obtained.

The contact angle of the porous membrane of this comparative example was measured to be 59.0±5.3°, and the pore size was 1.80 nm (under wet conditions). Comparison of the pore size and contact angle of the membranes prepared in examples and comparative examples is shown in Table 3.

TABLE 3

Comparison of pore size and contact angle of membranes prepared in examples and comparative examples

| Name | Reactant A | Reactant B | Hydrophilic inorganic nanomaterial | Nanoporous membrane | Water contact angle | Pore size* |
|---|---|---|---|---|---|---|
| Example 1 | Potassium phosphate | Calcium chloride | Calcium phosphate | Molybdenum diselenide | 22.4 ± 3.2° | 0.65 nm |
| Example 2 | Zirconium oxychloride | Potassium carbonate | Zirconium hydroxide | Tungsten disulfide | 8.2 ± 2° | 0.60 nm |
| Example 3 | Lanthanum nitrate | Potassium sulfide | Lanthanum sulfide | Graphene oxide | 39 ± 2.6° | 0.82 nm |
| Example 4 | Cerium chloride | Sodium silicate | Cerium silicate | Co—Al-LDHs | 20.6 ± 1.6° | 0.69 nm |
| Example 5 | Metatitanic acid | Hydrochloric acid | Titanium dioxide | $C_3N_4$ | 15.0 ± 0.9° | 1.1 nm |
| Comparative example 1 | — | — | — | Molybdenum diselenide | 65 ± 3.1° | 1.67 nm |

TABLE 3-continued

Comparison of pore size and contact angle of membranes prepared in examples and comparative examples

| Name | Reactant A | Reactant B | Hydrophilic inorganic nanomaterial | Nanoporous membrane | Water contact angle | Pore size* |
|---|---|---|---|---|---|---|
| Comparative example 2 | — | — | — | Graphene oxide | 60.3 ± 2.0° | 1.34 nm |
| Comparative example 3 | — | — | — | Co—Al-LDHs | 59.0 ± 5.3° | 1.80 nm |

Note:
The pore size here is the pore size of the nanomembrane under wet conditions.

What is claimed is:

1. A nanocomposite membrane for heavy metal rejection, comprising:
   (1) a nanoporous membrane being prepared from a two-dimensional sheet material and a polymer base membrane; and
   (2) a hydrophilic inorganic nanomaterial distributed in the interior and on the surface of the nanoporous membrane, the hydrophilic inorganic nanomaterial being formed by an interfacial reaction and dispersed between the sheets of the two-dimensional sheet material,
   wherein the average effective pore size of the nanocomposite membrane under wet conditions is not greater than 1.2 nm, and the size of the hydrophilic inorganic nanomaterial in the direction perpendicular to the nanocomposite membrane is less than 1.2 nm.

2. The nanocomposite membrane for heavy metal rejection according to claim 1, wherein the static water contact angle of the nanocomposite membrane is not greater than 45°.

3. The nanocomposite membrane for heavy metal rejection according to claim 1, wherein the hydrophilic inorganic nanomaterial is synthesized from reactants through the interfacial reaction by using the nanoporous membrane as an interface.

4. The nanocomposite membrane for heavy metal rejection according to claim 1, wherein the two-dimensional sheet material comprises any one or a combination of two or more of molybdenum sulfides, molybdenum selenides, tungsten sulfides, tungsten selenides, platinum selenides, rhenium selenides, tin sulfides, graphenes, graphene derivatives, $C_3N_4$, $Ti_4N_3$, and layered double hydroxides.

5. The nanocomposite membrane for heavy metal rejection according to claim 4, wherein the hydrophilic inorganic nanomaterial comprises, but is not limited to any one or a combination of two or more of silicates, phosphates, metal sulfides, metal oxides and metal hydroxides.

6. A preparation method of the nanocomposite membrane for heavy metal rejection according to claim 1, comprising the following steps:
   (1) dispersing a two-dimensional sheet material in water to prepare a two-dimensional sheet material dispersion, and then, pouring the dispersion into a suction flask in which a polymer base membrane is placed in advance, to carry out suction filtration and washing to obtain a nanoporous membrane; and
   (2) fixing the nanoporous membrane in a reaction tank, adding reactant A and reactant B on both sides of the nanoporous membrane so that the reactant A and the reactant B interfacially synthesize a hydrophilic inorganic nanomaterial, and washing to obtain a nanocomposite membrane.

7. The preparation method of the nanocomposite membrane for heavy metal rejection according to claim 6, wherein in the step (1), the two-dimensional nanosheet dispersion is prepared by ultrasonic dispersion, ultrasonic time is 0.02-10 h, and the concentration of the two-dimensional nanosheet dispersion is 0.0001-200 mg/L.

8. The preparation method of the nanocomposite membrane for heavy metal rejection according to claim 7, wherein the suction filtration in the step (1) is carried out at a pressure of 0.01-1 bar for 0.01-15 h.

9. The preparation method of the nanocomposite membrane for heavy metal rejection according to claim 8, wherein the time of the interfacial synthesis reaction in the step (2) is 0.1-24 h.

10. The nanocomposite membrane for heavy metal rejection according to claim 2, wherein the average effective pore size of the nanocomposite membrane under wet conditions is less than 1.2 nm.

11. The nanocomposite membrane for heavy metal rejection according to claim 10, wherein the hydrophilic inorganic nanomaterial is synthesized from reactants through the interfacial reaction by using the nanoporous membrane as an interface.

12. The nanocomposite membrane for heavy metal rejection according to claim 2, wherein the two-dimensional sheet material comprises any one or a combination of two or more of molybdenum sulfides, molybdenum selenides, tungsten sulfides, tungsten selenides, platinum selenides, rhenium selenides, tin sulfides, graphenes, graphene derivatives, $C_3N_4$, $Ti_4N_3$, and layered double hydroxides.

13. The nanocomposite membrane for heavy metal rejection according to claim 12, wherein the hydrophilic inorganic nanomaterial comprises, but is not limited to any one or a combination of two or more of silicates, phosphates, metal sulfides, metal oxides and metal hydroxides.

14. The nanocomposite membrane for heavy metal rejection according to claim 1, wherein the average effective pore size of the nanocomposite membrane under wet conditions is less than 0.9 nm.

* * * * *